United States Patent [19]
Hauck et al.

[11] Patent Number: 5,782,322
[45] Date of Patent: Jul. 21, 1998

[54] BRAKE ACTUATOR

[75] Inventors: Stefan Hauck, Hanover; Thomas Dieckmann, Pattensen; Christof Maron, Gehrden; Friedhelm Bergmann, Bad Pyrmont, all of Germany

[73] Assignee: Continental Aktiengesellschaft, Hanover, Germany

[21] Appl. No.: 653,132

[22] Filed: May 24, 1996

[30] Foreign Application Priority Data

May 26, 1995 [DE] Germany ............. 195 19 308.3

[51] Int. Cl.⁶ .................................................. F16D 55/18
[52] U.S. Cl. .................. 188/72.4; 188/72.1; 188/162; 310/77; 318/372
[58] Field of Search ..................... 188/72.4, 72.6, 188/72.7, 72.8, 72.1, 156, 158, 162; 303/115.2; 310/77, 80, 83; 318/372

[56] References Cited

U.S. PATENT DOCUMENTS

| | | | |
|---|---|---|---|
| 4,793,447 | 12/1988 | Taig et al. | 188/72.8 X |
| 4,877,113 | 10/1989 | Taig | 188/72.8 X |
| 4,922,121 | 5/1990 | Taft | 303/115.2 |
| 5,107,967 | 4/1992 | Fujita et al. | 188/156 X |
| 5,348,123 | 9/1994 | Takahashi et al. | 188/72.1 |

FOREIGN PATENT DOCUMENTS

| | | | |
|---|---|---|---|
| 3626751 | 9/1987 | Germany. | |
| 4229042 | 3/1993 | Germany. | |
| 405321961 A | 12/1993 | Japan | 188/162 |
| 89/03782 | 5/1989 | WIPO. | |

Primary Examiner—Robert J. Oberleitner
Assistant Examiner—Pamela J. Lipka
Attorney, Agent, or Firm—Walter Ottesen

[57] ABSTRACT

The invention is directed to a brake actuator (2) having a transmission including an electric motor (6) as a drive element, a converting device for converting the rotational movement of the electric motor (6) into a linear movement and a hydraulic transmission (16, 18, 20) for transmitting the linear movement of the converting device to a friction lining (22) of a brake. The brake actuator of the invention does not require a mechanical transmission connected between the motor and the hydraulic transmission. This is achieved with a converting device configured as a spindle unit (12, 14) and is realized in that the spindle nut (12) is fixedly connected to the electric motor (6) and the spindle rod (14) is fixedly connected to a first hydraulic piston (16) of the hydraulic transmission (16, 18, 20). The electric motor is provided with a hollow shaft (10) for accommodating the displacement stroke of the spindle rod.

8 Claims, 1 Drawing Sheet

BRAKE ACTUATOR

FIELD OF THE INVENTION

The invention relates to a brake actuator including an electric motor operating as a drive element, a converting device to convert the rotational movement of the electric motor into a linear movement and a hydraulic transmission for transmitting the linear movement of the converting device to a friction lining of a brake.

BACKGROUND OF THE INVENTION

German patent publication 4,229,042 discloses such a brake actuator which is provided with an electric motor and a threaded spindle. The threaded spindle is driven by the motor and a spindle nut is in engagement with a first hydraulic piston operatively connected to a hydraulic chamber. A second hydraulic piston operates on a friction lining for carrying out the braking action.

Notwithstanding a certain force transformation via the hydraulic transmission, such a brake actuator would require an oversized electric motor as a source of force. For this reason, and to obtain an adequate transformation of the torque generated by the motor, all embodiments in the above-mentioned German patent publication provide additional step-up transmissions connected between the motor and the converting device. Such a brake actuator is expensive and complex and is therefore not only expensive to manufacture, but is subject to malfunction in operation.

SUMMARY OF THE INVENTION

It is an object of the invention to provide a brake actuator having a simple transmission which is compact, light and especially permits a mechanical transmission to be omitted.

The brake actuator of the invention is for a vehicle brake having a brake pad defining a friction lining and a brake disc or the like for coacting with the brake pad. The brake actuator includes: a frame; an electric motor having a rotor rotatably mounted in the frame and the rotor having a hollow shaft defining an axis of rotation; a spindle assembly for converting the rotational movement of the rotor into a linear movement along the axis; the spindle assembly including: a threaded member fixedly connected to the rotor so as to rotate therewith; and, a spindle rod threadably engaged with the threaded member and mounted so as to extend into the hollow shaft; rotation restraining means for preventing the spindle rod from rotating when the threaded member is rotated thereby causing the spindle rod to execute the linear movement along the axis; a hydraulic transmission for transmitting the linear movement to the brake pad; the hydraulic transmission including a first hydraulic piston; a second hydraulic piston connected to the brake pad; and, a hydraulic medium between the hydraulic pistons; the first hydraulic piston being fixedly part of the spindle rod so as to be movable along the axis with the spindle rod to transmit force to the second hydraulic piston via the hydraulic medium; and, the second hydraulic piston being movably mounted on the frame for moving the brake pad into contact engagement with the brake disc in response to the force.

According to the invention, not only is the spindle rod connected directly to the drive motor, but the spindle nut is fixedly connected to the motor shaft. In contrast, the threaded spindle (spindle rod) is fixedly connected to the primary piston of a hydraulic transmission connected thereto.

The spindle assembly is used as a converting device in such a manner that, on the one hand, the spindle rod is not mounted on the transmission but on the drive piston and, on the other hand, the threaded member is not mounted on the drive piston but on the motor shaft. Compared to conventional brake actuators, numerous advantages are provided by the use of an electric motor having a hollow shaft.

These advantages include that the structural elevation of the electric motor is configured in such a manner that its hollow shaft can accommodate the entire spindle stroke so that the overall structural length of the brake actuator is very small. In contrast to the above-mentioned state of the art, all components are arranged on a single axis so that not only is the structural length very small, but the width is also very small. Overall, compact dimensions result from the advantageous arrangement of the components in combination with the hydraulic transmission.

Because of the simple construction, the brake actuator is very light in weight and this, together with the savings of space, affords an overall reduced manufacturing cost compared to the conventional brake actuators.

The motor is not mounted next to the spindle but instead is arranged coaxial with respect thereto. For this reason, the motor can be relatively wide and yet be configured to save space. Such a wide motor provides a relatively high torque so that already for this reason an intermediate mechanical transmission is unnecessary. A higher efficiency of the transmission is provided by the elimination of the mechanical transmission.

According to a preferred embodiment, the spindle rod includes an extension which defines the primary piston of the hydraulic transmission.

The spindle rod is dimensioned so as to be significantly thinner than the spindle nut which rolls thereupon. For this reason, the primary piston can also be configured to be correspondingly thin. In this way, it is possible without difficulty to design the hydraulic transmission to have an especially high transformation so that a series connected mechanical transmission can be omitted without it being necessary to rely on an over-dimensioned actuating piston on which the friction lining is mounted.

In this way, the mechanical inertia which perforce is associated with a mechanical transmission is avoided.

The first piston moves longitudinally in a first cylinder and is equipped with means for preventing rotation thereof about its longitudinal axis. In this way, it is ensured that the rotational movement of the spindle nut can neither be transmitted to the spindle rod nor to the first hydraulic piston.

The hydraulics which are configured in this manner is an effective low-transformation device. A further mechanical transmission, such as planetary gearing, is unnecessary.

The spindle nut is fixedly connected to the motor and, in a preferred embodiment, is formed on the hollow shaft as an internal thread. In each case, the spindle nut is an integral part of the rotor. The spindle is supported on the internal thread of the hollow shaft.

A longitudinal slot disposed on the spindle rod or on the first hydraulic piston prevents an entrainment thereof so that a revolution of the motor leads to a linear displacement of the spindle rod. At the same time, no additional bearings are required for the spindle drive.

In a first embodiment of the invention, the spindle rod is equipped with means for preventing rotation thereof. This means for preventing rotation can, for example, be provided in a conventional manner by a slot/key combination such as a slotted sleeve placed upon the spindle rod from the rear and slotted. However, such an arrangement for preventing rotation requires space which cannot be ignored.

In accordance with an advantageous embodiment of the invention, a significant amount of space is saved in that the first hydraulic piston, which is fixedly connected to the threaded spindle rod, is configured to prevent rotation about the longitudinal axis thereof. This is achieved by making the cross section of the first hydraulic piston noncircular, for example, the cross section can be elliptical. In this way, no additional measures are required to provide a means for preventing rotation of the spindle rod about its longitudinal axis.

An elliptical cross section has continuous radial transitions. In this way, an excellent seal of the piston is obtained. Such a cross-sectional profile of the first hydraulic piston (and the corresponding hydraulic cylinder) can, for example, be economically produced directly without machining by utilizing extruded aluminum profiles.

The second hydraulic piston is provided with the friction lining and is U-shaped when viewed in longitudinal section. The pot-shaped configuration of the second hydraulic piston makes it suitable for accommodating the stroke of the first hydraulic piston. In this way, a further savings in structural space and therefore in weight is made possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
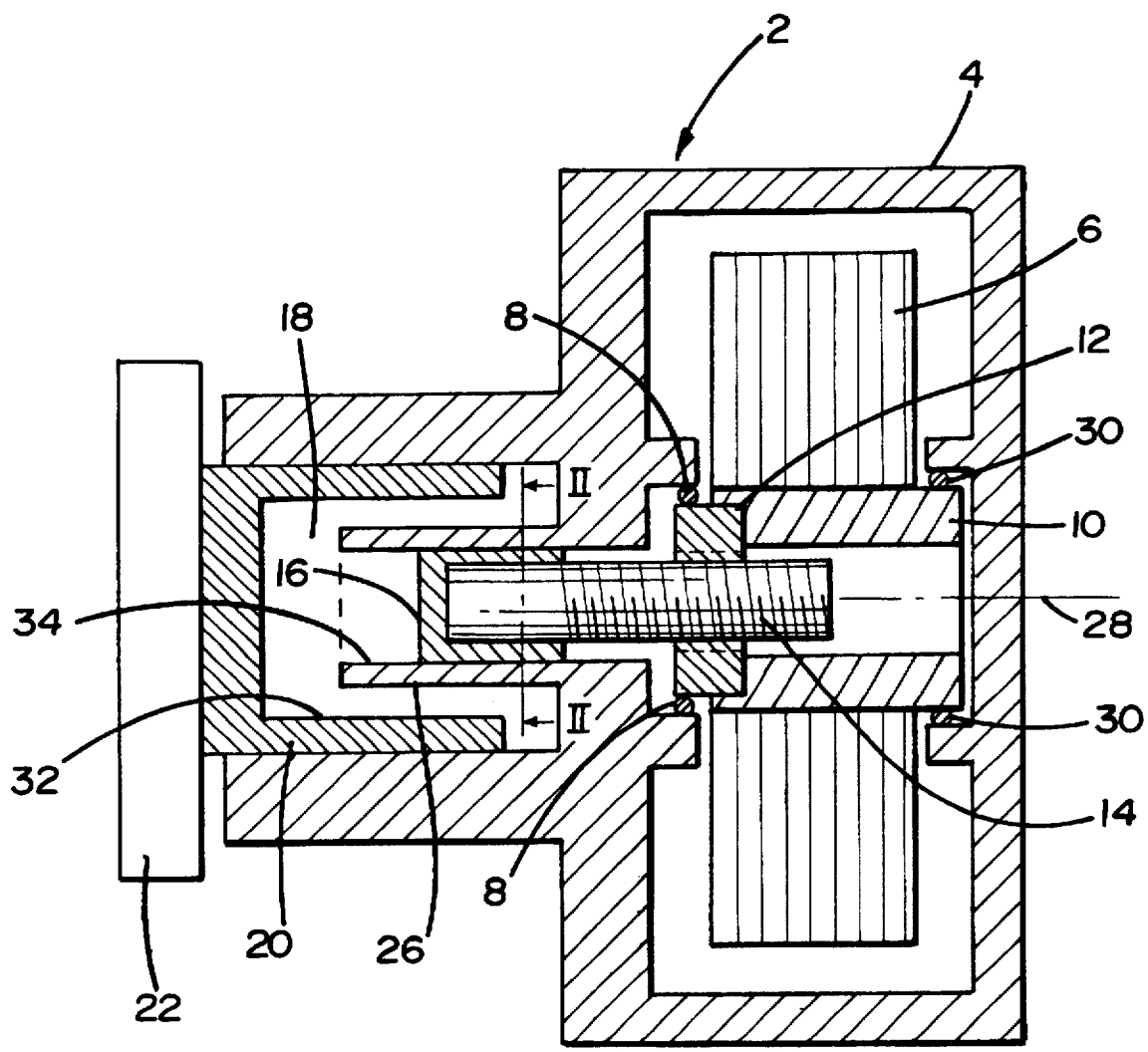
FIG. 1 shows an embodiment of the brake actuator of the invention in longitudinal section; and, FIG. 2 shows an enlarged section view taken along line II—II of FIG. 1.

The brake actuator is identified by reference numeral 2 in FIG. 1 and includes a frame or housing 4 in which the following are mounted: an electric motor 6 having a hollow shaft 10, a spindle unit (12, 14) comprising a spindle nut 12 and a spindle rod 14, and a hydraulic transmission (16, 18, 20) comprising a hydraulic chamber 18 containing hydraulic fluid, a first hydraulic piston 16 and a second hydraulic piston 20.

The friction lining (brake lining) 22 is displaced as in a conventional braking apparatus via a hydraulically-actuated piston 20. However, the pressure is generated directly at the brake by the motor/spindle unit (6, 12, 14) and a hydraulic transmission (16, 18, 20).

New with respect to the state of the art is especially that the arrangement of the spindle 14 is reversed and both spindle ends are integrated in the same component. Because of the concentric arrangement of the electric motor 6, spindle unit (12, 14) and the hydraulic transmission (16, 18, 20), the end portion of the spindle rod 14 facing toward the first hydraulic piston 16 can be directly configured as the first hydraulic piston 16.

The other end of the spindle rod 14 is accommodated within the hollow shaft 10 of the electric motor 6 by the selection of a suitable motor concept (for example, a switched reluctance motor). In this way, the brake actuator 2 of the invention can be accommodated in a small space.

The electric motor 6 with its hollow shaft 10 is fixedly connected to the nut 12 of the spindle drive. The spindle rod 14 is secured so that it is restrained from rotating with the nut 12.

Figure 2:
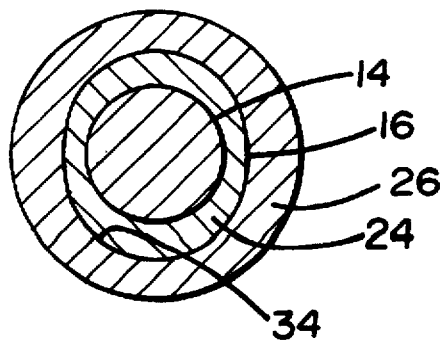

A preferred embodiment is shown in FIG. 2 wherein the first hydraulic piston 16 is restrained against rotation about the longitudinal axis 28. The spindle rod 14 and the first hydraulic piston 16 are fixedly connected to each other or even conjointly define a single unit. For this reason, a means for restraining rotation at the spindle rod 14 and such a means on the first hydraulic piston 16 are functionally the same.

In the specific embodiment shown, the means for preventing rotation is provided by configuring the first hydraulic piston 16 to have a noncircular cross section 24 and configuring the through channel 34 in sleeve 26 to likewise have a noncircular cross section as shown in FIG. 2. It is irrelevant whether the means for preventing rotation is realized on the spindle rod 14 or on the hydraulic piston 16. In each case, the rotation of the electric motor 6 leads to a displacement of the spindle rod along the longitudinal axis 28. No additional bearing is needed for the spindle drive. The spindle nut 12 is guided by the motor bearings 8 and bearings 30 guide the hollow shaft 10. The spindle rod 14 is supported in the spindle nut 12.

The spindle rod 14 operates on the slim first hydraulic piston 16, which, in turn, acts upon the second hydraulic piston 20 (brake piston) via an adapted area transformation and the hydraulic fluid in space 18. The spindle unit (12, 14) is disposed forward of the force-amplifying hydraulic transmission (16, 18, 20) and not rearward thereof. For this reason, the spindle unit (12, 14) has to take up only reduced axial forces. To actuate the brake, the spindle rod 14 is displaced a correspondingly larger distance with small forces.

With the embodiment of the invention shown, the spindle rod 14 disappears into the hollow shaft 10 of the electric motor 6 when the brake is not applied; whereas, when the brake is applied, the spindle rod 14 is driven forward and the first hydraulic piston 16 plunges into the space 18 provided in the interior of the hollowed-out second hydraulic piston 20 (brake piston) and causes the second hydraulic piston 20 to move to the left causing the brake lining 22 to contact engage a brake disc (not shown).

The arrangement of the invention is very compact because of the concentric arrangement of the components in combination with the use of the electric motor 6 with its hollow shaft 10 and the second hydraulic piston 20 having a hollow cavity 32.

It is understood that the foregoing description is that of the preferred embodiments of the invention and that various changes and modifications may be made thereto without departing from the spirit and scope of the invention as defined in the appended claims.

What is claimed is:

1. A brake actuator for a vehicle brake having a brake pad defining a friction lining, and a brake disc for coacting with the brake pad, the brake actuator comprising:

a frame;

an electric motor having a rotor rotatably mounted in said frame and said rotor having a hollow shaft defining an axis of rotation;

a spindle assembly for converting the rotational movement of said rotor into a linear movement along said axis;

said spindle assembly including: a threaded member fixedly connected to said rotor so as to rotate therewith; and, a spindle rod threadably engaged with said threaded member to execute said linear movement through a predetermined stroke;

said spindle rod being mounted so as to extend telescopically into said hollow shaft so as to cause at least a portion of said spindle rod to be within said hollow shaft during all of said stroke;

rotation restraining means for preventing said spindle rod from rotating when said threaded member is rotated thereby causing said spindle rod to execute said linear movement along said axis;

a hydraulic transmission for transmitting said linear movement to said brake pad;

said hydraulic transmission including a first hydraulic piston; a second hydraulic piston connected to said brake pad; and, a hydraulic medium between said hydraulic pistons;

said first hydraulic piston being fixedly connected to said spindle rod so that said first hydraulic piston cannot rotate relative thereto and so as to be movable along said axis with said spindle rod to transmit force to said second hydraulic piston via said hydraulic medium when said spindle rod and said first hydraulic piston are moved through said stroke along said axis; and, said second hydraulic piston being movably mounted on said frame for moving said brake pad into contact engagement with said brake disc in response to said force.

2. The brake actuator of claim 1, said threaded member being a nut fixedly connected to said rotor.

3. The brake actuator of claim 1, said threaded member being defined by said hollow shaft having an internal thread formed thereon to threadably engage said threaded spindle.

4. The brake actuator of claim 1, said spindle rod having an extension formed thereon to define said first hydraulic piston so that said spindle rod and said first hydraulic piston conjointly define an integral unit.

5. A brake actuator for a vehicle brake having a brake pad defining a friction lining, and a brake disc for coacting with the brake pad, the brake actuator comprising:

a frame;

an electric motor having a rotor rotatably mounted in said frame and said rotor having a hollow shaft defining an axis of rotation;

a spindle assembly for converting the rotational movement of said rotor into a linear movement along said axis;

said spindle assembly including: a threaded member fixedly connected to said rotor so as to rotate therewith; and, a spindle rod threadably engaged with said threaded member and mounted so as to extend into said hollow shaft;

rotation restraining means for preventing said spindle rod from rotating when said threaded member is rotated thereby causing said spindle rod to execute said linear movement along said axis;

a hydraulic transmission for transmitting said linear movement to said brake pad;

said hydraulic transmission including a first hydraulic piston; a second hydraulic piston connected to said brake pad; and, a hydraulic medium between said hydraulic pistons;

said first hydraulic piston being fixedly part of said spindle rod so as to be movable along said axis with said spindle rod to transmit force to said second hydraulic piston via said hydraulic medium;

said second hydraulic piston being movably mounted on said frame for moving said brake pad into contact engagement with said brake disc in response to said force;

said frame including a sleeve for slideably holding said first hydraulic piston as said first hydraulic piston moves linearly along said axis with said spindle rod;

said rotation restraining means including said first hydraulic piston configured to have a noncircular cross section; and, said sleeve defining a channel having a noncircular cross section corresponding to said noncircular cross section of said first hydraulic piston.

6. The brake actuator of claim 1, said second hydraulic piston having a U-shaped configuration when viewed in longitudinal section.

7. The brake actuator of claim 5, said noncircular cross section of said first hydraulic piston being elliptical and said cross section of said channel likewise being elliptical.

8. The brake actuator of claim 1, said second hydraulic piston being connected directly to said brake pad whereby said brake pad receives said force directly via said second hydraulic piston.

* * * * *

UNITED STATES PATENT AND TRADEMARK OFFICE
CERTIFICATE OF CORRECTION

PATENT NO. : 5,782,322
DATED : July 21, 1998
INVENTOR(S) : Stefan Hauck, Thomas Dieckmann, Christof Maron and Friedhelm Bergmann It is certified that error appears in the above-indentified patent and that said Letters Patent is hereby corrected as shown below:

```
    In column 6, line 8:  delete "nod" and substitute -- rod --
therefor.
```

Signed and Sealed this

Twenty-eighth Day of September, 1999

*Attest:*

Q. TODD DICKINSON

*Attesting Officer*   *Acting Commissioner of Patents and Trademarks*